United States Patent [19]

Joglekar et al.

[11] 4,239,456
[45] Dec. 16, 1980

[54] ROTOR BLADE OUT-OF-PLANE CENTRIFUGAL PENDULUMS

[75] Inventors: Mukund M. Joglekar, Euless; Troy M. Gaffey; Willem Broekhuizen, both of Arlington; William D. Neathery, Fort Worth, all of Tex.

[73] Assignee: Textron, Inc., Providence, R.I.

[21] Appl. No.: 37,658

[22] Filed: May 10, 1979

[51] Int. Cl.³ ............................................. B64C 27/32
[52] U.S. Cl. ..................................... 416/145; 416/500
[58] Field of Search ................. 416/144, 145, 500, 18, 416/139 A

[56] References Cited

U.S. PATENT DOCUMENTS

| 2,489,343 | 11/1949 | Wasserman et al. | 416/18 X |
| 2,519,762 | 8/1950 | Hoffmann et al. | 416/145 X |
| 2,795,284 | 6/1957 | Sikorsky | 416/145 X |
| 2,845,131 | 7/1958 | Laufer | 416/18 X |
| 2,934,151 | 4/1960 | Jenney | 416/138 A X |
| 3,035,643 | 5/1962 | Kelley et al. | 416/18 |
| 3,372,758 | 3/1968 | Jenney | 416/18 |
| 3,540,809 | 11/1970 | Paul et al. | 416/145 X |

Primary Examiner—Everette A. Powell, Jr.
Attorney, Agent, or Firm—Richards, Harris & Medlock

[57] ABSTRACT

A helicopter having a main rotor lift unit includes a plurality of pendulus mass units (44, 46) mounted to oscillate in a plane perpendicular to the chord plane of the rotor blade (10). The mass units (44, 46) are connected to a rotatable shaft (28) which passes through or adjacent the blade grip (12) for each blade (10). Hubshear vibrations generated parallel to the axis of the rotor mast (18) are damped by the oscillating mass units (44, 46) which are tuned to minimize the vibrations transmitted from the lift unit to the fuselage.

15 Claims, 6 Drawing Figures

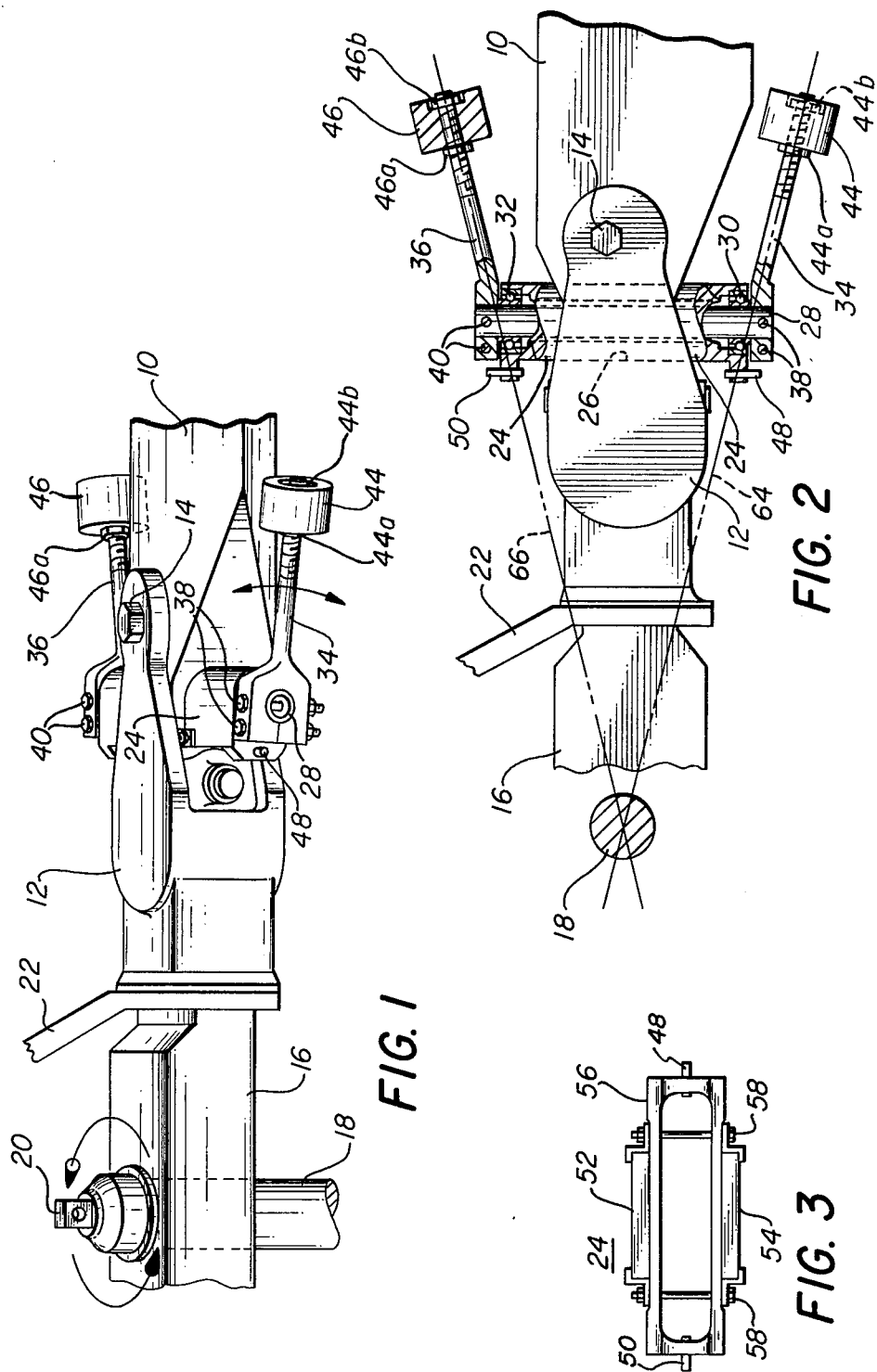

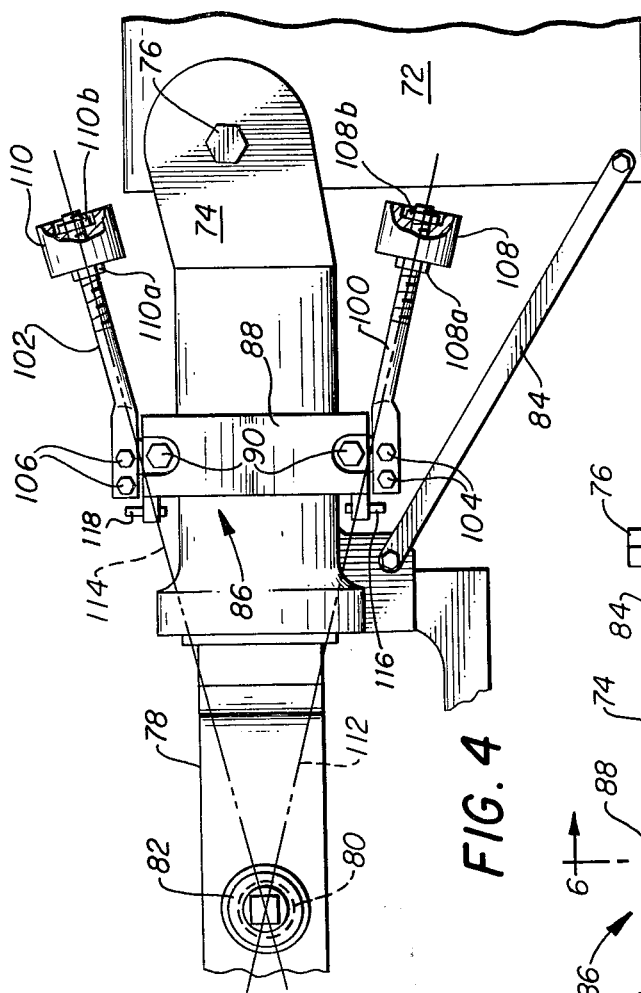
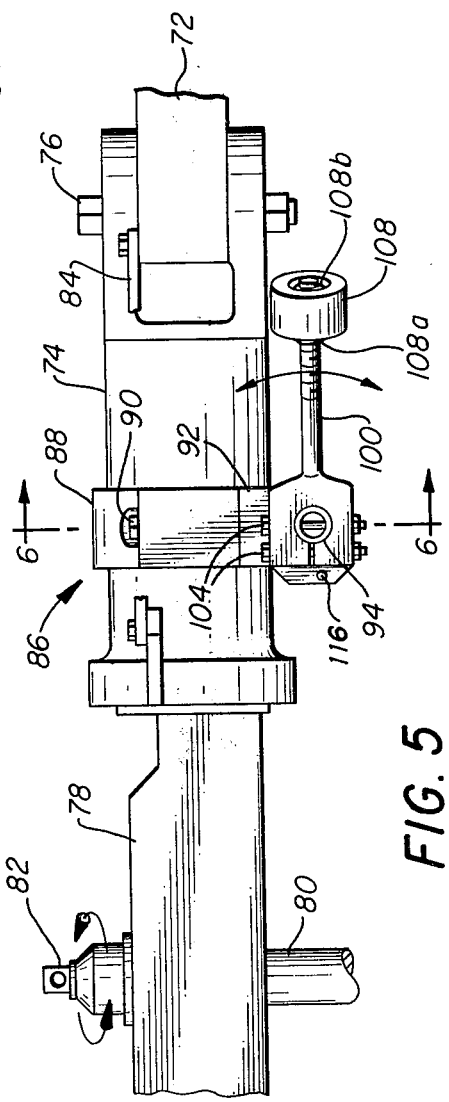
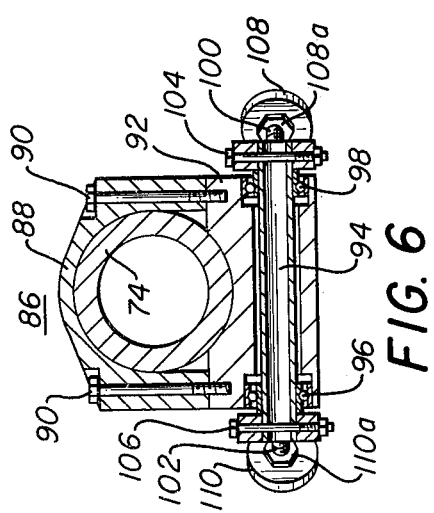

ROTOR BLADE OUT-OF-PLANE CENTRIFUGAL PENDULUMS

TECHNICAL FIELD

The present invention pertains to vibration isolation in helicopters, and more particularly to a vibration damping centrifugal pendulum mounted on the blade grip or blade of a helicopter rotor.

BACKGROUND ART

Vibration is a problem which is freqently encountered in the operation of helicopters. An oscillatory hubshear force is produced, for example, at the rotor hub of the lift unit of a two-bladed helicopter with the oscillatory force having a frequency that is two times that of the revolution rate of the rotor, i.e., two-per-rev. This force is primarily generated by the effects of the translational speed of the helicopter and by the periodic pitch change of each rotor blade during each revolution. This hubshear force is generated in the blades and transmitted vertically through the rotor mast to the helicopter fuselage. Excessive vibration resulting from this periodic force received at the fuselage causes discomfort for the passengers and decreases the life of fatigue-loaded components. Efforts have been made and continue to be made to attenuate or eliminate these vibrations in order to extend the operational life of the aircraft and improve the ride characteristics.

The problem of hubshear vibrations in a helicopter rotor have been addressed in U.S. Pat. No. 3,540,809 to Paul, et al. In this patent, it is shown that inplane rotor vibrations can be absorbed to some extent by means of bifilar vibration dampers which rotate with the helicopter rotor. The bifilar dampers oscillate while rotating with the mast and are tuned to absorb vibrations generated at a particular frequency. Further helicopter vibration absorber devices utilizing pendulums are disclosed in U.S. Pat. No. 3,372,758 to Jenney and U.S. Pat. No. 3,053,643 to Kelley, et al.

Despite the development of the above vibration absorbers, there exists a need for a grip or blade mounted, tunable, free pendulum for damping out-of-plane vibrations in a helicopter rotor.

BRIEF DESCRIPTION OF THE DRAWINGS

For a more complete understanding of the present invention and the advantages thereof, reference is now made to the following description taken in conjunction with the accompanying drawings in which:

FIG. 1 is a perspective view of a centrifugal pendulum mounted on a helicopter rotor blade in accordance with the present invention, FIG. 2 is a plan view, partially sectioned, of the rotor assembly shown in FIG. 1, FIG. 3 is an elevation view of the pendulum clamp assembly shown in FIGS. 1 and 2, FIG. 4 is a plan view of a further embodiment of the present invention wherein a centrifugal pendulumis mounted on a blade grip, FIG. 5 is an elevation view of the centrifugal pendulum, grip and rotor blade shown in FIG. 4, and FIG. 6 is a sectional view taken along lines 6—6 of the clamp assembly shown in FIG. 5.

DETAILED DESCRIPTION OF THE INVENTION

Referring to FIGS. 1-3, a rotor blade 10 is connected to a grip 12 by means of a blade bolt 14. Grip 12 is connected to a hub 16 which is in turn secured to a mast 18 by means of a mast nut 20. A pitch horn 22 extends outward from grip 12 and is operated by linkage (not shown) to control the pitch of blade 10.

A centrifugal pendulum clamp assembly 24 is mounted in a passage 26 which extends horizontally through blade 10. A shaft 28 extends through the center of assembly 24 and is supported therein by bearings 30 and 32. A pair of pendulum arms 34 and 36 are mounted on the ends of shaft 28 and secured thereto by bolt sets 38 and 40, respectively.

Arms 34 and 36 are threaded along the free ends thereof and have mounted on the threaded portions pendulum weights 44 and 46. Weight 44 is locked on arm 34 by nuts 44a and 44b which are threadedly engaged to arm 34. Likewise, weight 46 is locked on arm 36 by nuts 46a and 46b which are engaged on arm 36. Stops 48 and 50 are mounted on assembly 24 to limit the travel of arms 34 and 36.

In FIG. 1 there is illustrated a single blade 10, grip 12, assembly 24 together with related pendulum elements, there is, however, an identical group of components, not shown, located on the opposite side of mast 18.

Assembly 24 is illustrated in detail in FIG. 3. The exterior surface of the assembly 24 is adhesively bonded to the interior surface of passage 26. This bonding rigidly secures assembly 24 to blade 10. Assembly 24 includes upper and lower blade tangs 52 and 54 which are secured to a housing 56 by bolts 58.

When arms 34 and 36 are positioned parallel to the chord plane of blade 10, the axes of the arms are shown by lines 64 and 66, respectively. These axis lines pass through the center line of mast 18 such that the pendulum weights 44 and 46 are each located in a plane which is parallel to and intersects the axis of mast 18.

Referring to FIGS. 1-3, the pendulum weights 44 and 46 are mounted on shaft 28 such that they can swing freely within the bounds of stops 48 and 50. When the rotor unit is motionless, the pendulum weights 44 and 46 will rest on stops 48 and 50 due to gravity. But when the rotor unit begins turning, a centrifugal force field will be developed to cause the weights 44 and 46 to swing outward and approach being positioned in a plane parallel to the chord plane of blade 10. During flight, the rotor blade is driven at a constant rotation rate which essentially fixes the centrifugal force field in which the pendulum weights 44 and 46 operate. In the absence of any external excitations, the pendulum weights 44 and 46 are positioned essentially outward from mast 18 due to the centrifugal force field. Under this condition the pendulum weights are essentially motionless relative to blade 10.

When the helicopter (not shown) is in flight the rotor blades will be cyclically driven about the feathering axis thereof to produce the desired flight performance for the aircraft. The pitch motion of the rotor blades, together with various aerodynamic forces, generate, among other forces, oscillatory hubshear vibrations which act essentially paraliel to the axis of mast 18. The primary vibration produced as a result of these forces occurs two times for each revolution of the rotor blade and is therefore termed a two-per-revolution vibration. This vibration is transmitted through the mast 18 to the helicopter fuselage. It is an object of the present invention to utilize the pendulum weights 44 and 46 of the present invention to dampen the two-per-revolution vibrations generated by the rotor blades.

The oscillatory two-per-revolution forces generated in rotor blade 10 cause the pendulum weights 44 and 46 to oscillate in reaction to the applied forces and at the same frequencies thereof. The pendulum weights oscillate within the centrifugal force field and are positioned on the arms 34 and 36 by means of the securing nuts so that the pendulum assembly as a whole generates periodic counteracting forces at the same frequency as the two-per-revolution vibrations. Both the phase and amplitude of the counteracting forces are dependent upon the physical parameters of the centrifugal pendulum assembly. The process of adjusting a physical parameter of the pendulum assembly to change the assembly response is termed tuning. The pendulum assembly of the present invention is tuned by positioning the pendulum weights 44 and 46 at various positions along arms 34 and 36. The pendulum weights are positioned so that counteracting forces are generated which are essentially of the same magnitude as the two-per-revolution forces but have the opposite phase so as to essentially damp the hubshear blade-induced vibrations.

Since the centrifugal pendulum assembly of the present invention is rigidly connected by assembly 24 to blade 10, the pendulum weights and arms are moved along with blade 10 in pitch rotation about the feathering axis of the blade. But, as the pendulum assembly rotates about the feathering axis, the geometry of vibration damping for out-of-plane vibrations is altered and the damping effect is changed. The maximum two-per-revolution vibrations occur when the rotor blade is being driven to the maximum pitch angle, a condition which occurs when the aircraft is in high speed flight. Therefore, the centrifugal pendulum assembly is tuned to provide the maximum damping under the condition of the rotor blade being driven to the maximum pitch angle which is generally encountered.

As shown in FIG. 2, the tuning arms 34 and 36 are not mounted normal to shaft 28 but are mounted so that the axes of the arms pass through the center of mast 18 when the weights 44 and 46 are positioned in the chord plane of blade 10. This arrangement substantially reduces the moment forces which would be applied to the arms 34 and 36 in relation to shaft 28 if the arms were mounted normal to shaft 28. The mounting of the arms in this manner in turn reduces the fatigue loading on the centrifugal pendulum components and reduces the weight of the components due to the lesser stresses involved. However, the arms 34 and 36 can be mounted at an angle to shaft 28 such that the axes of the arms do not pass through the center of mast 18 and the pendulum assembly of the present invention will still function in the same manner described above. The out-of-plane forces generated at the two-per-revolution frequency are at a maximum amplitude when the helicopter is in forward flight. The vibrations, however, are at a substantially reduced level when the helicopter is in the hover mode. The centrifugal pendulum assembly is tuned to absorb vibrations at a predetermined harmonic of the rotational rate of the rotor blade. Therefore, the pendulum assembly of the present invention provides a damping function over a wide range of operating rotor speeds.

An alternative embodiment of the centrifugal pendulum assembly of the present invention is illustrated in FIGS. 4–6. A blade 72 is secured to a grip 74 by a blade bolt 76. The grip 74 is in turn connected to a hub 78 which is secured to a mast 80 by a mast nut 82. Blade 72 is also connected to grip 74 through a support brace 84.

A clamp assembly 86 is secured to grip 74 on the external surface thereof. Clamp assembly 86 includes an upper bracket 88 which is connected by bolts 90 to a lower housing 92. As shown in FIG. 6, the members 88 and 92 are shaped on the interior surfaces thereof to mate with grip 74 so as to be rigidly connected thereto.

A shaft 94 passes through housing 92 and is supported by bearings 96 and 98. On each end of shaft 94 there are mounted respectively arms 100 and 102 which are secured to the shaft by bolt sets 104 and 106. Arms 100 and 102 are threaded along the free ends thereof and receive pendulum weights 108 and 110 respectively. Weight 108 is secured to arm 100 by nuts 108a and 108b which are threadedly engaged to arm 100. Likewise, weight 110 is secured to arm 102 by nuts 110a and 110b which are threadedly engaged to arm 102.

The axes of arms 100 and 102 are shown by lines 112 and 114 when the weights 108 and 110 are in the chord plane of blade 72. In this position the axis of each arm passes through mast 80.

Stops 116 and 118 are mounted on housing 92 to limit the rotational travel of arms 100 and 102 to prevent weights 108 and 110 from damaging any of the components of the rotor lift unit.

An identical assembly to that shown in FIG. 4 is connected to yoke 78 opposite mast 80, but, the duplicate assembly is not illustrated.

The centrifugal pendulum assembly comprising shaft 94, together with arms 100 and 102, with respective weights 108 and 110, functions in the same manner as the centrifugal pendulum described above in reference to FIGS. 1–3 for damping oscillatory hubshear vibrations. The significant difference between the embodiment shown in FIGS. 4–6 as compared to that shown in FIGS. 1–3 is that the embodiment shown in FIG. 4 is mounted on the grip as opposed to the mounting of the embodiment shown in FIG. 1 through the rotor blade. The embodiment shown in FIGS. 4–6 is utilized when it is not possible to mount the pendulum shaft through the rotor blade. Therefore, the assembly shown in drawings 4–6 is more easily adapted to an existing rotor blade system as a modification thereto.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

We claim:

1. Apparatus for reducing oscillatory shear forces in a helicopter rotor assembly having a plurality of blades, each blade affixed to a blade grip which is secured to a hub that is mounted on a rotatable mast, the combination comprising:
    (a) a set of pivot means, one pivot means corresponding with each said grip and said blade affixed thereto, said pivot means equidistant from the axis of said mast and each pivot means substantially parallel to the chord plane of the corresponding blade, and
    (b) masses mounted in the form of simple pendulums, two on each said pivot means, said masses on each of said pivot means further mounted for rotation with the corresponding blade about the pitch axis thereof.

2. Apparatus for reducing oscillatory shear forces as recited in claim 1 wherein said pivot means comprises a rotatable shaft affixed adjacent each said grip.

3. Apparatus for reducing oscillatory shear forces as recited in claim 1 further including means for tuning the response of said pendulums.

4. Apparatus for reducing oscillatory shear forces in a helicopter rotor assembly having a plurality of blades, each blade affixed to a blade grip which is secured to a hub that is mounted on a rotatable mast, the combination comprising:
 (a) a set of pivot means, one extending through each said blade and equidistant from the axis of said mast and substantially parallel to the chord plane of said blade adjacent thereto, and
 (b) masses mounted in the form of simple pendulums, two on each said pivot means and further mounted for rotation with said adjacent blade about the pitch axis of said adjacent blade.

5. Apparatus for reducing oscillatory shear forces as recited in claim 4 wherein said pivot means comprises a shaft extending through a passageway in said blade, said shaft mounted to freely rotate about the axis thereof with respect to said blade.

6. Apparatus for reducing oscillatory shear forces as recited in claim 4 further including means for tuning the response of said pendulums.

7. Apparatus for reducing oscillatory shear forces in a helicopter rotor assembly having a plurality of blades, each blade affixed to a blade grip which is secured to a hub that is mounted on a rotatable mast, the combination comprising:
 (a) a set of pivot means, one clamped to each said grip, said pivot means equidistant from the axis of said mast and substantially parallel to the chord plane of the blade adjacent thereto, and
 (b) masses mounted in the form of simple pendulums, two on each said pivot means and further mounted for rotation with said adjacent blade about the pitch axis of said adjacent blade.

8. Apparatus for reducing oscillatory shear forces as recited in claim 7 wherein said pivot means comprises a rotatable shaft mounted externally to said grip.

9. Apparatus for reducing oscillatory shear forces as recited in claim 7 further including means for tuning the response of said pendulums.

10. Apparatus for reducing oscillatory shear forces in a helicopter rotor assembly having a plurality of blades, each blade affixed to a blade grip which is secured to a hub that is mounted on a rotatable mast, the combination comprising:
 (a) a housing extending through a passageway in said blade, said housing parallel to the chord plane of said blade,
 (b) a shaft extending centrally through said housing and mounted on bearings for free rotation thereof,
 (c) an arm rigidly mounted transversely on each end of said shaft, and
 (d) a mass mounted on each said arm to form a simple pendulum pivotable about said shaft.

11. Apparatus for reducing oscillatory shear forces as recited in claim 10 wherein said masses are slidable on said arms and said arms are threaded to receive nuts on either side of said masses to fix the position of said masses on said arms.

12. Apparatus for reducing oscillatory shear forces as recited in claim 10 wherein said arms are fixed to said shaft at an angle to have the axes of said arms pass through said mast when said arms are in the chord plane of the adjacent blade.

13. Apparatus for reducing oscillatory shear forces in a helicopter rotor assembly having a plurality of blades, each blade affixed to a blade grip which is secured to a hub that is mounted on a rotatable mast, the combination comprising:
 (a) a clamp assembly comprising a U-shaped bracket and a housing joined together in a clamp fit onto each of said grips,
 (b) a rotatable shaft extending through each of said housings, each said shaft essentially parallel to the chord pland of the adjacent blade,
 (c) an arm fixed to each said shaft at each end thereof, said arms extending transversely to the axis of said shafts, and
 (d) a mass mounted on each said arm to form a simple pendulum pivotable about said shaft.

14. Apparatus for reducing oscillatory shear forces as recited in claim 13 wherein said masses are slidable on said arms and said arms are threaded to receive nuts on either side of said masses to fix the position of said masses on said arms.

15. Apparatus for reducing oscillatory shear forces as recited in claim 13 wherein said arms are fixed to said shaft at an angle to have the axes of said arms pass through said mast when said arms are in the chord plane of said adjacent blade.

* * * * *